United States Patent [19]

McMurtry et al.

[11] Patent Number: 5,214,857
[45] Date of Patent: Jun. 1, 1993

[54] CALIBRATION DEVICE

[75] Inventors: David R. McMurtry, Wotton-Under-Edge; Benjamin R. Taylor, Trelleck; Roger M. Badland; Marcus J. Eales, both of Wotton-Under-Edge, all of United Kingdom

[73] Assignee: Renishaw Transducer Systems Limited, Gloucestershire, United Kingdom

[21] Appl. No.: 864,338

[22] Filed: Apr. 6, 1992

[30] Foreign Application Priority Data

Apr. 12, 1991 [GB] United Kingdom ............... 9107774
Jun. 21, 1991 [GB] United Kingdom ............... 9113459

[51] Int. Cl.$^5$ ........................... G01B 5/14; G01B 7/14
[52] U.S. Cl. ........................................ 33/502; 33/644; 73/1 J
[58] Field of Search ............... 33/502, 503, 644, 645; 73/1 R, 1 J

[56] References Cited

U.S. PATENT DOCUMENTS

| | | | |
|---|---|---|---|
| 4,367,591 | 1/1983 | Hirabayashi et al. | 33/644 |
| 4,435,905 | 3/1984 | Bryan . | |
| 4,536,962 | 8/1985 | Hense et al. | 33/644 |
| 4,777,818 | 10/1988 | McMurtry | 73/1 J |
| 4,884,348 | 5/1989 | Zeller et al. | 33/502 |
| 5,111,590 | 5/1992 | Park | 33/502 |
| 5,125,261 | 6/1992 | Powley | 73/1 J |

FOREIGN PATENT DOCUMENTS

| | | |
|---|---|---|
| 0329635 | 8/1989 | European Pat. Off. . |
| 0209857 | 9/1986 | Japan ................. 33/502 |
| 61-209857 | 9/1986 | Japan . |
| 62-79947 | 4/1987 | Japan . |
| 0159502 | 6/1990 | Japan ................. 33/644 |
| 89/11631 | 11/1989 | PCT Int'l Appl. . |
| 2210978A | 6/1989 | United Kingdom . |
| WO85/05176 | 11/1985 | World Int. Prop. O. . |

OTHER PUBLICATIONS

J. B. Bryan, "A Simple Method For Testing Measuring Machines and Machine Tools Part 1: Principles and applications"; *Precision Engineering*, Apr. 1982, vol. 4, No. 2.

Primary Examiner—William A. Cuchlinski, Jr.
Assistant Examiner—Alvin Wirthlin
Attorney, Agent, or Firm—Oliff & Berridge

[57] ABSTRACT

Telescopic ball bar 24 has a male member provided by a sphere 22 at one end and a female member provided by a pair of forks 30 at the other. The ball bar is attached to the spindle 10 of a machine tool by a universal pivotal coupling between the sphere 22 and a magnetic socket 14 retained on the spindle 10. The ball bar 24 is attached to the table by a further universal pivotal coupling between a sphere 28 retained on the table 12 in a clamping device 40, and the forks 30. In use, the spindle is operated to move in a circular path about a center defined by the center of the sphere 28. Any deviation of the spindle movement from such a circular path will be detected by a transducer 36, provided in the bar 24, which bears against the surface of the sphere 28. The position of the center of the sphere 28 is determined by bringing the sphere 28 into engagement with the socket 14, and measuring the position of the spindle 10 at that point. Easy engagement between the sphere 28 and the socket 14 is facilitated by the clamping device 40, which enables the sphere 28 to move relative to the table to engage the socket 14. Once the sphere 28 has engaged the socket 14 (and the position of its center has been measured by measuring the position of the spindle 10), the sphere 28 may be clamped rigidly relative to the table 12 for a calibration operation.

16 Claims, 3 Drawing Sheets

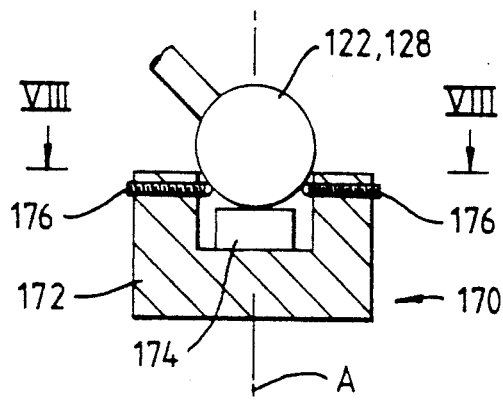
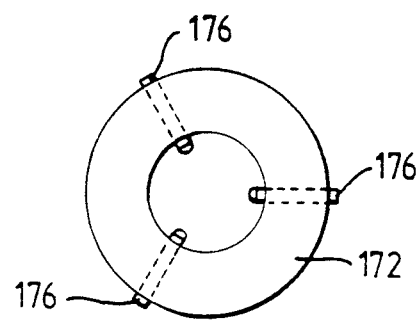
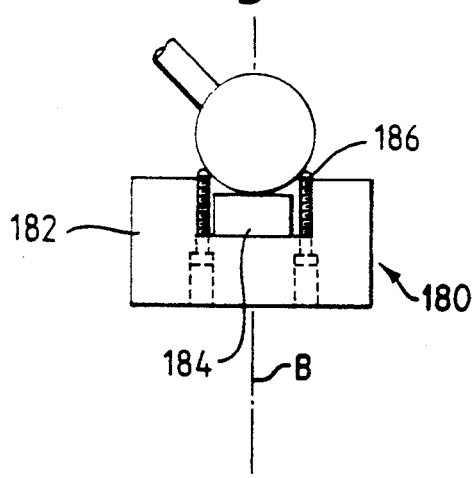
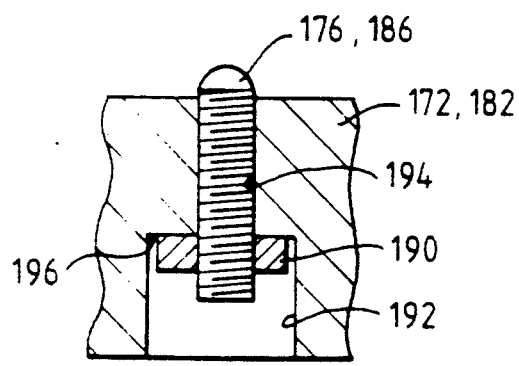

CALIBRATION DEVICE

BACKGROUND OF THE INVENTION

1. Field of the Invention

The invention relates to the calibration of coordinate positioning machines, such as machine tools or coordinate measuring machines.

Such machines typically comprise an arm (e.g. a toolholder) movable in three dimensions relative to a table or base on which, for example, a workpiece is supported. It is frequently desired to calibrate such machines to determine the accuracy to which for example a toolholder on a machine tool may describe a circular trajectory with respect to a fixed centre on the workholder of the machine.

2. Description of Related Art

A known device for performing such a calibration operation is described in U.S. Pat. No. 4,435,905. The device comprises an elongate telescopic bar provided with a ball at each end. In use, each of the balls is retained in a socket provided on the toolholder and the workholder respectively, and the toolholder is then driven in a circular path about the centre of the ball retained in the socket on the workholder. A single axis transducer provided on the bar measures any variation in the centre-to-centre spacing of the balls, and thus determines the extent to which the tool holder path varies from a circular path. It is also known from GB 2,210,978 to provide a ball on each of the tool holder and workholder, and an interconnecting transducer between the two balls. The interconnector comprises a bar having a socket at one end for universally pivotally engaging one of the balls, and a plurality of forks at the other end of the bar for engaging the other of the balls to enable both universal pivotal motion, and linear motion of the other of the balls relative to the bar. A pair of single axis transducers are provided on the bar to determine the variation in spacing between the two balls as the tool holder is driven in a circular path.

In each of the above mentioned calibration devices, it is a requirement in order to accurately calibrate the machine to determine the centre of motion about which, for example, the tool holder is to be driven. In these known devices, this centre is defined by the centre of the ball which is secured to the workholder of the machine. Existing methods for determining the position of the centre of the ball retained on the workholder are based on trial and error. For example, with the toolholder and workholder engaged with the bar, the toolholder is moved to diametrically opposing points about a position which is assumed to be the centre of the ball retained on the workholder. The difference in the outputs between the single axis transducer readings at each of the two locations of the toolholder is used to determine a distance by which the centre of the ball retained on the workholder is to be moved in order to position it coincidentally with the position at which its centre is assumed to be. Such methods are time consuming.

SUMMARY OF THE INVENTION

Accordingly, the present invention provides apparatus for calibrating a coordinate positioning machine, the machine having a table, and an arm movable relative to the table in at least two dimensions, the apparatus comprising: a male and a female support member, each adapted to be retained on one of the movable arm and the table, transducer apparatus comprising an elongate telescopic bar having a male coupling member at one end for forming a universal pivotal connection with the female support member, and a female coupling member at the other end for forming a universal pivotal connection with the male support member, and means for measuring the distance between said two male members.

The apparatus according to the invention enables easy determination of the location of the point about which (for example) the movable arm of the machine is to be driven in a circular path, simply by engaging the male and female support members provided on the machine with each other, and measuring the position of the movable arm when the two support members are engaged.

Preferably, one of the support members is retained on the machine by means which enable the support member in question to be moved in 3-dimensions relative to the part of the machine on which it is retained, and to be rigidly, but releasably clamped relative to the machine in a position within its range of permitted movement. This ability of one of the support members to move and be rigidly clamped relative to the machine enables easy and accurate engagement of the male and female support members.

Preferably, both the male members will be provided by spherical elements, and the female support member is provided by a magnetic socket. In one embodiment the female coupling member is also provided by a magnetic socket. In a further embodiment the female coupling member will preferably enable both universal pivotal motion and linear motion of the male support member relative to the bar.

A further independent aspect of the present invention relates to a magnetic socket used to form a coupling with a spherical male member. This aspect of the present invention provides a magnetic socket for forming a coupling with a spherical male member having a body on which three areas of surface are supported, and a magnet for urging the spherical male member into contact with the areas of surface, wherein each of the areas of surface is made of a material having a lower hardness than the material of the spherical male member.

This reduces wear and damage to the surface of the spherical male member retained in the socket which, because it must be made of ferromagnetic material, is relatively soft.

Preferably each of the areas of surface is provided by an individual support element of copper alloy such as phosphor bronze.

In an alternative embodiment the areas of surface are provided by a ring of PTFE.

BRIEF DESCRIPTION OF DRAWINGS

Embodiments of the present invention will now be described, by way of example, and with reference to the accompanying drawings in which;

FIG. 7 is a more detailed view of one embodiment of a magnetic socket used in the device shown in FIG. 6;

FIG. 8 is a more detailed view of the magnetic socket shown in FIG. 7;

FIG. 9 is a more detailed view of another embodiment of a magnetic socket used in the device shown in FIG. 6; and FIG. 10 is a more detailed view of the magnetic socket shown in FIG. 9.

DESCRIPTION OF PREFERRED EMBODIMENTS

Figure 1:
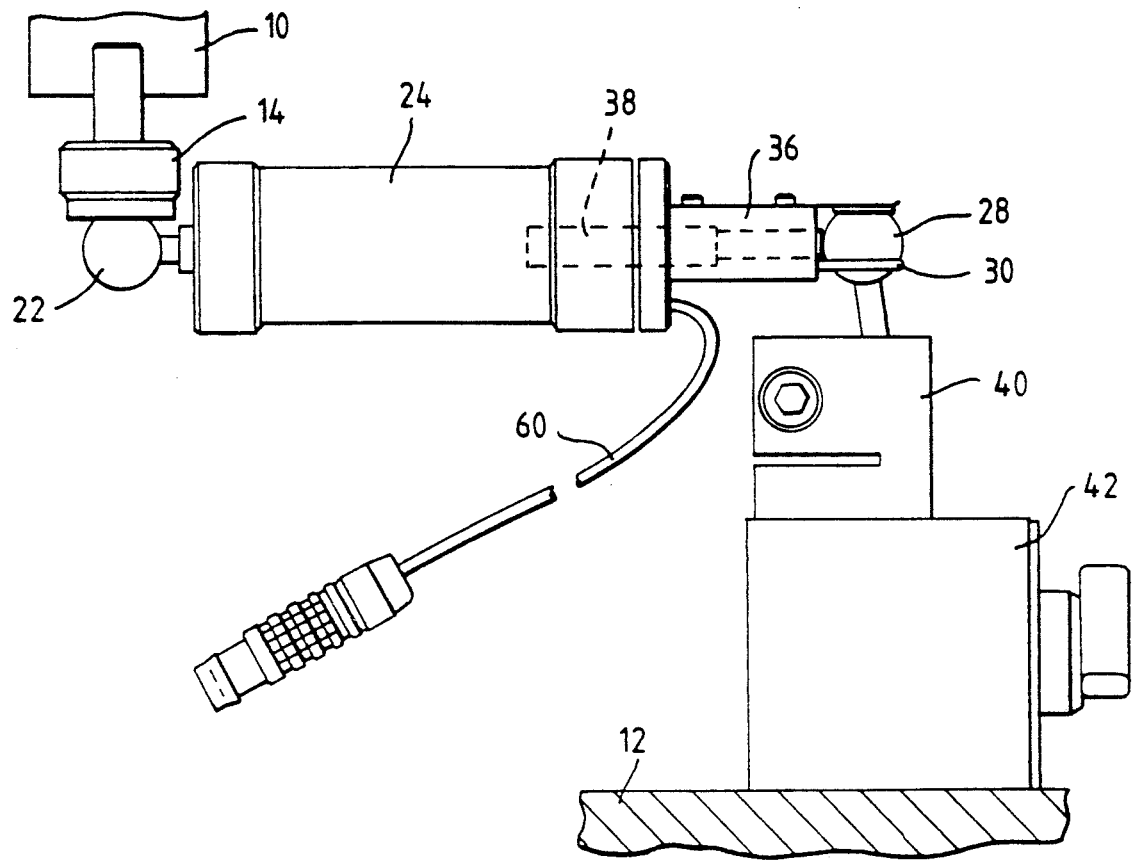
FIG. 1 is an elevation of an apparatus according to a first embodiment of the present invention.
Figure 2:
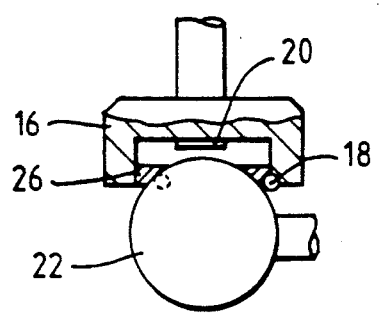
FIG. 2 is a more detailed view of the female support member and male coupling member shown in FIG. 1.

Referring now to FIG. 1 the movable arm 10 of a machine is movable (such movement being measured relative to a datum by transducers on the machine) relative to a table 12 in three dimensions, and the arm supports a female support member provided by a socket 14. The socket 14 is shown in more detail in FIG. 2 and comprises a cylindrical cup 16 supporting three equi-spaced support elements provided by balls 18 in its inner rim. A magnet 20 is supported in the base of the cup 16, and the magnet 20 urges a male coupling member in the form of a spherical element 22 provided at one end of a telescopic bar 24 into engagement with the three balls 18. A foam pad 26 situated adjacent the balls 18 is impregnated with a suitable oil (e.g. a silicone based oil) to enable a continual supply of lubricant between the surfaces of the spherical element 22 and the balls 18.

Figure 3:
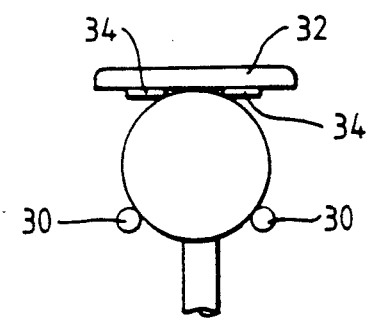
FIG. 3 is a more detailed view of the male support member and female coupling member shown in FIG. 1.

The other end of the bar 24 is engaged with a male support member provided by a spherical element 28 for both universal pivotal motion and linear motion relative to the element 28. The mechanism enabling this movement is shown additionally in FIG. 3 and comprises a pair of elongate parallel extending rods 30 and a leaf-spring 32 which urges the spherical element 28 into engagement with the rods 30. A pair of foam pads 34 are provided on the leaf-spring 32 which are impregnated with lubricant to provide continual lubrication between the surface of spherical element 28, the rods 30 and leaf-spring 32. A movable piston 36 is provided at the other end of the bar 24, and the piston 36 abuts the surface of the element 28. The piston 36 is part of a linear displacement transducer 38 provided inside the bar 24 which, when calibrated, determines the distance between the spherical elements 22 and 28. Linear displacement transducers are well known per se and will not be described further. The output of the transducer 38 is transmitted via a cable 60 to a processing device (not shown).

Figure 4:
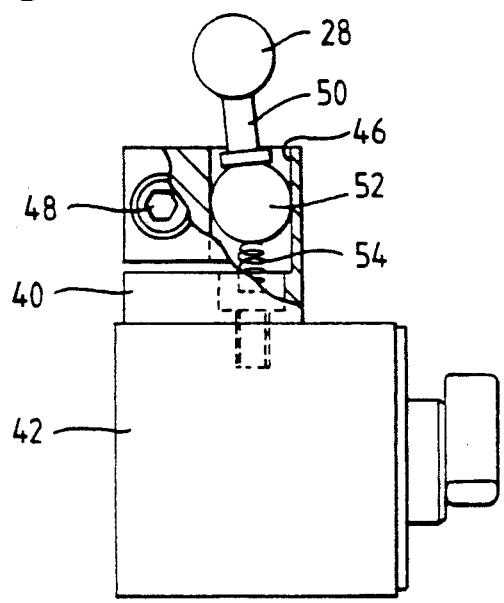
FIG. 4 is a more detailed view of the retaining device shown in FIG. 1.
Figure 5:
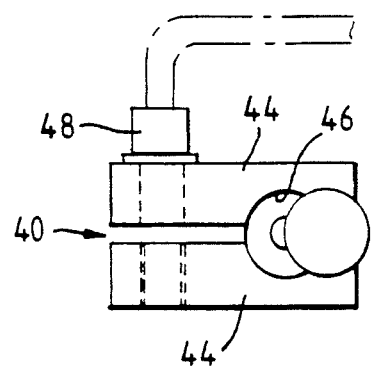
FIG. 5 is a more detailed view of the jaws of the retaining device shown in FIG. 1.

The spherical element 28 is supported on the table 12 of the machine by a retaining device 40 which is itself supported in a workholder 42. The retaining device 40 permits movement in 3-dimensions of the spherical element 28 relative to the table 12 and can rigidly clamp the element 28 relative to the table 12. The retaining device 40 is shown in more detail in FIGS. 4 and 5 and comprises a clamping device having a pair of jaws 44 which enclose a cylindrical bore 46. The jaws 44 may be opened and closed by screw threaded engagement of a clamping bolt 48 with each of the jaws 44. The retaining device also includes a structure for supporting element 28 in clamping device. As is best illustrated in FIG. 4, the spherical element 28 is supported on a carrying bar or stem 50, itself supported by a spherical carrying member 52 which lies inside of the bore 46. A spring 54 is provided within the bore 46 to urge the carrying member 52 out of the bore 46.

During a calibration operation, it is desired to drive the male coupling member provided by spherical element 22 in a circular path about a point defined by the centre of the male support member, provided by spherical element 28. In order to instruct the machine to drive the arm 10 in such a circular path it is necessary to determine the position of the centre of the spherical element 28. Thus, prior to performing a calibration operation, with the bar 24 disengaged from the socket 14 and element 28, the arm of the machine 10 is moved so that the female support member, provided by socket 14 may engage the spherical element 28. Easy engagement of the socket 14 and element 28 is enabled by slackening the clamping bolt 48 to enable free movement of spherical carrying member 52 in the bore 46, and thus free movement of the element 28; the spring 54 provides a resilient vertical support for the carrying member 52 (and thus element 28) and further aids easy engagement of socket 14 and element 28. Once the socket 14 and the element 28 are engaged, the clamping bolt 48 is re-tightened thus fixing the position of the spherical element 28 relative to the table 12. As mentioned above the position of the arm 10, and thus the socket 14 is known relative to a datum from the transducers provided on the machine, and since the socket 14 is in engagement with the element 28, the position of the centre of the spherical element 28 at this time is easily determinable.

The socket 14 is then disengaged from the spherical element 28 (the retaining device now preventing any movement of the element 28) and the bar 24 connected between the arm 10 and the table 12 as shown in FIG. 1. The arm may thus then be driven in a circular path around the centre of the element 28 since the position of the centre has just been determined.

While in the illustrated embodiment a male support member (i.e. the spherical element 28) is provided on the table 12, and a female support member (e.g. socket 14) is provided on the arm 10, entirely equivalent arrangements are envisaged with e.g. socket 14 on the table 12 and element 28 on the arm 10. Additionally the retaining device 40 may be provided on the arm 10, with the male or female support member which is provided on the table 12 being rigidly supported thereto.

An alternative ball-bar apparatus according to the present invention will now be described with reference to FIG. 6. In this embodiment the movable arm 110 (e.g. the spindle) of a machine tool carries a female coupling member provided by a magnetic socket 114, and is movable in 3-dimensions relative to a table 112. A male coupling member provided by a spherical reference element 128 is supported on the table 112 by a retaining device 140. The retaining device 140 is similar to the retaining device 40 described in the first embodiment, and has a clamping device 143 operable by a clamping bolt 148 to retain a carrying member (not shown). The carrying member is connected to the carrying stem 150, which in turn supports spherical element 128. In this embodiment of the present invention the retaining device 140 has a magnetic base and is thus magnetically retained on the table 112.

The male and female support members 128,114 are interconnected by a transducer apparatus provided by a telescopic ball-bar 124. A male coupling member provided by spherical element 122, and situated at one end of the bar 124 is magnetically retained in the socket 114 to enable universal pivotal motion of the bar 124 relative to the arm 110. The other end of the ball-bar 124 has a female coupling member provided by a magnetic socket 130, in which the spherical element 128 is retained. A linear displacement transducer (not shown) provided within the ball-bar 124 determines (when calibrated) the spacing of the spherical elements 122,128. The output of the transducer is sent via a cable 160 to a computer in order to calibrate the machine. The ball-bar of this embodiment is set up and operated to calibrate the machine exactly as described with reference to the first embodiment of the present invention.

Figure 6:
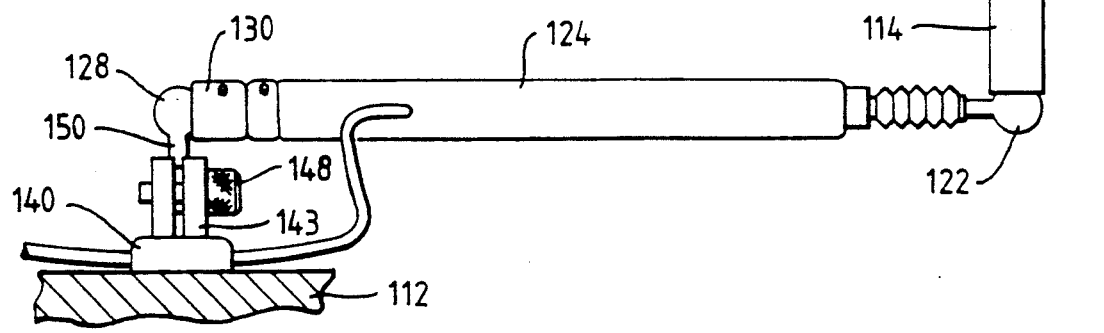
FIG. 6 is an elevation of an apparatus according to a second embodiment of the present invention.

FIGS. 7 to 10 illustrate alternative forms of magnetic socket, which are used in conjunction with the ball-bar 124 of FIG. 6. A socket 170 has a cup-shaped cylindrical body 172 having an axis A, in which a magnet 174 is retained. The body 172 supports three radially extending, and equispaced support elements, provided by ball-ended screws (made of a copper alloy such as phosphor-bronze) 176 in correspondingly screw-threaded bores. In use, the spherical elements 122;128 are urged into the socket 170 by the magnet 174 and rest against the three areas of surface provided by the ball-ends of the screws 176. The position in which the spherical elements 122;128 are retained in the socket 170 may be adjusted by adjusting the radial displacement of the screws 176.

Referring now to FIG. 9, a socket 180 comprises a cup-shaped cylindrical body 182 having an axis B and a permanent magnet 184 supported in the cup. The body 182 supports three axially extending copper alloy ball-ended screws 186 which are equi-spaced about axis B. In use, the spherical elements 122;128 are urged into the socket 180 by the magnet 184 and are supported by three areas of surface provided by the ball-ends of the screws 186. As with the first embodiment of the present invention, the position of the spherical elements 122;128 within the socket 180 may be adjusted by adjusting the radial position of the screws 186.

Referring now to FIG. 10, the screws 176;186 are retained in position by lock nuts 190 which lie in an enlarged portion 192 of the screw-threaded bore 194, and bear against a flat face 196 of the body 172;182 which surrounds the screws 176;186.

In tests of the arrangements described above (in which the spherical elements 122;128 are made of chrome plated steel) it has been found that no deterioration of the surface of the spherical elements 122;128 occurs after 10,000 revolutions of the elements within the socket. By providing three areas of surface whose positions are adjustable within the body 172;182 of the socket 170;180, any alteration in the position of the spherical elements 122;128 occurring over a large number of revolutions due to wear of the ball-ended surfaces of the screws 176;186 may be offset by adjusting the position of the screws.

It is not essential for the screws 176;186 to be of phosphor bronze; advantages in wear may be obtained where the material from which the screws 176;186 are made has a substantially lower hardness than the material of the spherical elements 122;128. Also, the screws 176;186 do not have to be adjustable within the body 172;182; their position may be fixed. Nor is it essential for the screws to be equi-spaced, or for them to extend radially or axially provided that they support the spherical elements 122;128 in a stable position. Further, it is not essential for the ends of the screws 176,186 to be ball-ended, provided that the ends are such that the spherical elements are stably supported.

In an alternative embodiment of socket, the areas of surface for supporting the spherical elements 122;128 may be provided by a ring situated inside the rim of the body 172;182 of the socket. According to this alternative the ring may be of e.g. phosphor bronze or PTFE.

We claim:

1. Apparatus for calibrating a coordinate positioning machine, the machine having a table and an arm, the table and arm being movable relative to each other in at least two dimensions, the apparatus comprising:
   an elongate telescopic bar;
   a pair of support members, one of said support members being provided on the table and the other of said support members being provided on the arm;
   means for universally pivotally connecting each end of the bar to one of said support members;
   the bar including a transducer for providing an output dependent upon the distance between the support members wherein;
   a retaining device is provided for supporting one of said support members on one of the table and the arm, the retaining device including a base, and means for permitting movement of said one of said support members in at least two dimensions relative to the base and for releasably retaining said one of said support members in a fixed position relative to the base.

2. Apparatus according to claim 1, wherein said retaining device supports said one of said support members on the table.

3. Apparatus according to claim 1 wherein said retaining device includes means permitting movement of said one of said support members relative to the base in three dimensions.

4. Apparatus according to claim 1 wherein said retaining device comprises releasable clamping means for clamping said one of said support members in said fixed position.

5. Apparatus according to claim 1 wherein said retaining device comprises a carrying stem connected at one end to said one of said support members and at the other end to a carrying member, and releasable clamping means provided on the table for clamping said carrying member in a fixed position relative to the table of the machine.

6. Apparatus according to claim 5 wherein said clamping means comprises a pair of jaws enclosing a bore for receiving said carrying member, and means for urging said jaws together to rigidly clamp the carrying member in the bore.

7. Apparatus according to claim 6 comprising biasing means for urging said carrying member out of said bore.

8. Apparatus according to claim 7 wherein said carrying member is a sphere.

9. Apparatus according to claim 1 wherein one of said support members is a female member and the other of said support members is a male member, said bar having a male coupling member at one end and a female coupling member at the other end for forming said universal pivotal connections with said female and male support members respectively.

10. Apparatus according to claim 9 wherein each male member is provided by a spherical reference element.

11. Apparatus according to claim 10 wherein said female support member is provided by a socket for said reference element.

12. Apparatus according to claim 11 wherein said female coupling member is provided by a socket for said reference element.

13. Apparatus according to claim 11 wherein said female coupling member is provided by a pair of forks.

14. Apparatus according to claim 13 wherein each of said male members is made of ferromagnetic material, and each of said sockets comprises three surface areas for supporting one of said male members, each of said sockets being made of a material having a lower hardness than the ferromagnetic material, and a magnetic for urging one of said male members into contact with the areas of surface.

15. Apparatus according to claim 14 wherein each of said surface areas is made of a copper alloy.

16. Apparatus for calibrating a coordinate positioning machine, the machine having a table, and an arm, the table and arm being movable relative to each other in at least two dimensions, the apparatus comprising:
- an elongate telescopic bar having a male coupling member at one end, and a female coupling member at the other end;
- a male support member and a female support member, one of said support members provided on the table and the other of said support members being provided on the arm;
- said male and female support members forming universal pivotal connections with said female and male coupling members respectively;
- a transducer provided on the bar for generating an output dependent upon the distance between the support members; and
- said male support member and said female support member being adapted to engage each other to permit determination of the position of said male support member relative to a datum.

* * * * *